(12) United States Patent
Gu et al.

(10) Patent No.: US 9,981,259 B2
(45) Date of Patent: May 29, 2018

(54) METHOD AND APPARATUS FOR PRODUCING RECYCLABLE PHOTOCATALYTIC PARTICULATES

(71) Applicants: Frank X. Gu, Kitchener (CA); Stuart Andrew Linley, Aurora (CA)

(72) Inventors: Frank X. Gu, Kitchener (CA); Stuart Andrew Linley, Aurora (CA)

(*) Notice: Subject to any disclaimer, the term of this patent is extended or adjusted under 35 U.S.C. 154(b) by 0 days. days.

(21) Appl. No.: 15/027,136

(22) PCT Filed: Oct. 6, 2014

(86) PCT No.: PCT/CA2014/050964
§ 371 (c)(1),
(2) Date: Apr. 4, 2016

(87) PCT Pub. No.: WO2015/048909
PCT Pub. Date: Apr. 9, 2015

(65) Prior Publication Data
US 2016/0243536 A1    Aug. 25, 2016

Related U.S. Application Data

(60) Provisional application No. 61/961,089, filed on Oct. 4, 2013.

(51) Int. Cl.
*B01J 35/00* (2006.01)
*B01J 21/20* (2006.01)
(Continued)

(52) U.S. Cl.
CPC ......... *B01J 35/0033* (2013.01); *B01J 21/063* (2013.01); *B01J 21/08* (2013.01); *B01J 21/18* (2013.01); *B01J 21/20* (2013.01); *B01J 35/002* (2013.01); *B01J 35/004* (2013.01); *B01J 35/006* (2013.01); *B01J 35/0013* (2013.01); *B01J 37/10* (2013.01)

(58) Field of Classification Search
None
See application file for complete search history.

(56) References Cited

U.S. PATENT DOCUMENTS

| 6,558,553 B1 | 5/2003 | Amal et al. |
| 2008/0069887 A1 | 3/2008 | Baran et al. |

OTHER PUBLICATIONS

Zhang et al, TiO2Graphene Nanocomposites for Gas-Phase Photocatalytic Degradation of Volatile Aromatic Pollutant: Is TiO2 Graphene Truly Different from Other TiO2 Carbon Composite Materials?, 2010, ACS Nano, vol. 4, No. 12, pp. 7303-7314.*

(Continued)

*Primary Examiner* — Melvin C. Mayes
*Assistant Examiner* — Stefanie J Cohen
(74) *Attorney, Agent, or Firm* — Gowling WLG (Canada) LLP; Jeffrey W. Wong (57) ABSTRACT

The disclosure is directed at a method of producing a recyclable photocatalytic particulate. The recyclable photocatalytic particulate includes metal oxide nanoparticles and electrically insulative magnetic particles which are amine functionalized and then added to a sheet of graphene oxide, preferably in solution. This combination is then hydrothermally treated to create covalent bonds between the metal oxide nanoparticles and the graphene oxide sheet and the electrically insulative controlled aggregates with the graphene oxide sheet.

14 Claims, 6 Drawing Sheets

(51) Int. Cl.
    *B01J 37/10*     (2006.01)
    *B01J 21/06*     (2006.01)
    *B01J 21/08*     (2006.01)
    *B01J 21/18*     (2006.01)

(56) References Cited

OTHER PUBLICATIONS

Tang et al, Magnetic TiO2-graphene composite as a high-performance and recyclable platform for efficient photocatalytic removal of herbicides from water, 2013, journal of hazardous materials, vol. 252-253, pp. 115-122.*

Chen et al, Zinc Oxide/Reduced Graphene Oxide Composites and Electrochemical Capacitance Enhanced by Homogeneous Incorporation of Reduced Graphene Oxide Sheets in Zinc Oxide Matrix, j. phys. chem, vol. 115, pp. 2563-2571 (Year: 2011).*

Kui et al, A brief review of graphene-based material synthesis and its application in environmental pollution management, chinese science bulletin, vol. 57, No. 11, pp. 1223-1234 (Year: 2012).*

Aquino et al, amine functionalized titania based porous structures for carbon dioxide postcombustion capture, j. phys. chem. C, May 2013, vol. 117, pp. 9747-9757 (Year: 2013).*

Wang et al, synergistic removal of Pb(II), Cd(II) and Humic acid by Fe3O4@mesoporous silica- graphene oxide composites, PLOS one, Jun. 2013, vol. 8, issue 6, pp. 1-8 (Year: 2013).*

NPL database search, conducted Jan. 19, 2018 (Year: 2018).*

Tang et al., "Magnetic TiO2-graphene composite as a high-performance and recyclable platform for efficient photocatalytic removal of herbicides from water", Journal of Hazardous Materials, Mar. 4, 2013, pp. 115-122, vol. 252-253.

Ye et al., "Magnetically recoverable core-shell nanocomposites with enhanced photocatalytic activity", Chemistry, A European Journal, Jun. 1, 2010, pp. 6243-6250, vol. 16-21.

Zhang et al., "Engineering the Unique 2D Mat of Graphene to Achieve Graphene-TiO2 Nanocomposite for Photocatalytic Selective Transformation: What Advantage does Graphene Have over Its Forebear Carbon Nanotube?", ACS Nano, Aug. 26, 2011, pp. 7426-7435, vol. 5(9).

Canadian Intellectual Property Office as International Searching Authority, International Search Report and Written Opinion for PCT/CA2014/050964, dated Dec. 5, 2014.

* cited by examiner

METHOD AND APPARATUS FOR PRODUCING RECYCLABLE PHOTOCATALYTIC PARTICULATES

CROSS-REFERENCE TO RELATED APPLICATIONS

This application claims the benefit of priority of U.S. Provisional Patent Application No. 61/961,089 filed Oct. 4, 2013, which is hereby incorporated by reference.

FIELD

The current disclosure relates generally to the treatment of contaminants in a liquid and more specifically to a method and apparatus for producing recyclable photocatalytic particulates.

BACKGROUND

With the emergence of complex organic contaminants resilient to conventional water purification methods, alternative advanced treatment techniques, such as membrane filtration, adsorption, and photocatalysis have come under heavy research. Notably, titanium dioxide, a wide band-gap semiconductor with the capability of producing reactive oxygen species in water under UV radiation has proved effective for degrading organic materials while producing benign $CO_2$ as an end product. This ability to remove contaminants completely and efficiently combined with low cost, low toxicity, and high abundance make it a beneficial treatment platform for dealing with organic pollutants. However, despite the existence of commercial $TiO_2$ formulations with excellent photocatalytic efficiency, they have found minimal use in industrial or commercial water treatment. One of the principal reasons for this is the difficulty associated with recovering nano-scale dispersions of the catalyst for re-use, diminishing the potential efficiency of the catalyst and posing an environmental threat due to the release of the catalyst into natural bodies of water.

Various techniques have been investigated in an attempt to address this issue including immobilization of $TiO_2$ nanomaterials on various substrates such as sand, glass or polymer beads and membranes. While these techniques solve the problems associated with $TiO_2$ separation after treatment, they simultaneously introduce other problems related to photocatalytic efficiency, such as limiting dispersion of the catalyst throughout the solution thereby limiting interaction with contaminants.

Therefore, there is provided a novel modular method and apparatus for producing recyclable photocatalytic particulates.

SUMMARY OF THE DISCLOSURE

It is an object of the disclosure to provide an improved method and apparatus for producing recyclable photocatalytic particulates. The recyclable photocatalytic particulates may then be used in the treatment of contaminants in liquids, such as, but not limited to water. Contaminants that may be treated include, but are not limited to, volatile organic compounds (VOCs) including benzene, toluene, ethyl-benzene and xylene; naphthenic acids (NAs) such as classical NAs (c-NAs) and oxidized NAs (oxy-NAs); and total petroleum hydrocarbons (TPH) such as aliphatic compounds such as fulvic acid and humic acid, and aromatic compounds such as fluorine and naphthalene.

In one embodiment, the recyclable photocatalytic particulates include ceramic photocatalysts and electrically insulated controlled aggregates (CSAs) which are combined with a graphene oxide sheet. In one embodiment, a CSA is a Controlled Aggregate of SPIONs (Controlled SPION Aggregate) where SPION stands for "Superparamagnetic Iron Oxide Nanoparticle". By using CSAs, a higher magnetic force per particle may be attained for separation purposes and retain superparamagnetic qualities observed in iron oxide nanoparticles. This reduces or prevents further aggregation during treatment due to residual magnetic forces and allows for fast separation after treatment.

This combination is then hydrothermally treated in order to produce covalent bonds between the photocatalysts and CSAs with the graphene oxide sheet.

According to an aspect of the present disclosure, there is provided a method of producing a recyclable photocatalytic particulate including producing electrically insulated magnetic particles; retrieving ceramic photocatalysts; amine functionalizing ceramic photocatalysts and electrically insulated magnetic particles; and combining the amine functionalized ceramic photocatalysts and amine functionalized electrically insulated magnetic particles with a graphene oxide sheet.

In another aspect of the present disclosure, there is provided A recyclable photocatalytic particulate including at least one ceramic photocatalyst; electrically insulated magnetic particles; and a sheet of graphene oxide; wherein the at least one ceramic photocatalyst and the electrically insulated magnetic particles are amine functionalized before being combined with the sheet of graphene oxide.

BRIEF DESCRIPTION OF THE DRAWINGS

These and other features of the disclosure will become more apparent from the following description in which reference is made to the appended drawings wherein.

DETAILED DESCRIPTION

The disclosure is directed a method and apparatus for producing recyclable photocatalytic particulates. In a preferred embodiment, the recyclable photocatalytic particulate is a magnetically separable reduced graphene oxide supported titanium dioxide ($TiO_2$) photcatalyst where the photocatalyst includes $TiO_2$ nanoparticles and silica-coated controlled aggregates (silica-coated CSA or $SiO_2$/CSA), typically of superparamagnetic iron oxide nanoparticles. Both the $TiO_2$ nanoparticles and silica-coated CSA are combined with a graphene oxide sheet. Prior to being combined with the graphene oxide sheet, the $TiO_2$ nanoparticles and the CSA may be amine functionalized. After being combined, the entire combination may be hydrothermally treated.

Titanium dioxide photocatalysis has been previously proposed as a treatment technique for removing low concentrations of organic contaminants from water by a photocatalytic process. Although $TiO_2$ has been specifically proposed, any metal oxide having similar characteristics are considered. While the use of titanium dioxide photocatalysis is most effective when applied in a nano-dispersion, this introduces the problem of recovering the material after treatment. It was found that $TiO_2$ nanoparticles and insulated magnetic nanoparticles of a specific structure could be bound to a sheet of reduced graphene oxide to improve recovery or recyclability. This association with graphene oxide and magnetic particles allows the $TiO_2$ nanoparticles to be efficiently recovered from water by applying a magnetic field. Photocatalytic properties were also improved by contact with the reduced graphene oxide.

In one embodiment, the magnetic nanoparticles or CSAs are designed as a controlled aggregate of superparamagnetic iron oxide nanoparticles. In another embodiment, a CSA is a Controlled Aggregate of SPIONs (Controlled SPION Aggregate) where SPION stands for "Superparamagnetic Iron Oxide Nanoparticle". By using CSAs, a higher magnetic force per particle may be attained for separation purposes and retain superparamagnetic qualities observed in iron oxide nanoparticles. This reduces or prevents further aggregation during treatment due to residual magnetic forces and allows for fast separation after treatment.

This provides the magnetic nanoparticles with the benefit of a high magnetic force per particle and superparamagnetic properties, meaning ferromagnetic behaviour is only exhibited in the presence of a magnetic field. The magnetic nanoparticles are then coated in a layer of electrically insulating silicon dioxide or similar material to reduce or prevent electrical contact with the iron oxide core of CSA which may reduce magnetic properties and photocatalytic activity of the CSA. Both the insulated magnetic particles and the $TiO_2$ particles can be amine functionalized by a simple procedure resulting in both sets of particles or nanoparticles having a positive surface charge in solution which will allow the set of particles to complex with graphene oxide when mixed. A hydrothermal treatment induces the formation of covalent linkages between the sets of particles and the surface of the graphene oxide sheet and the graphene oxide is simultaneously reduced.

By using a modular synthesis approach, larger insulated magnetic aggregate particles can be used and the synthesis is easily controllable to select desired surface coverage of the photocatalyctic particulate by $TiO_2$ or magnetic particles.

Figure 1:
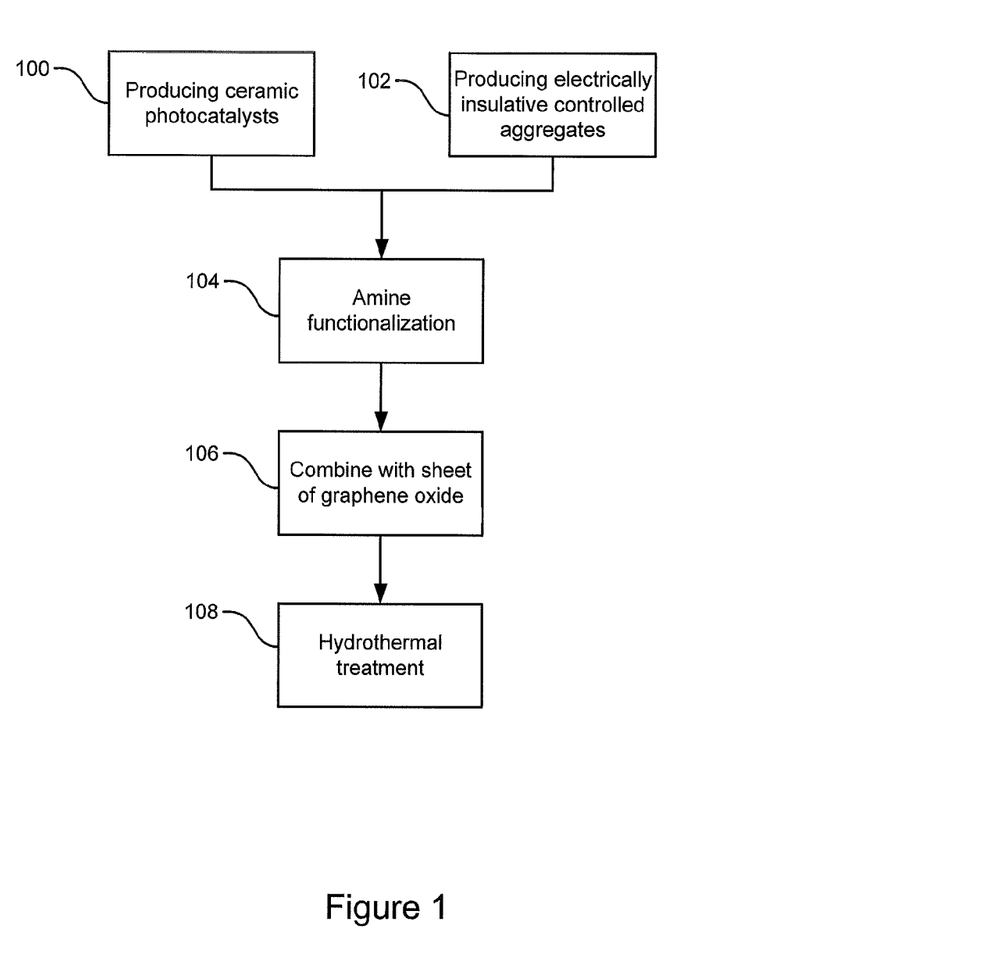
FIG. 1 is a flowchart outlining a method for producing recyclable photocatalytic particulates.
Figure 2:
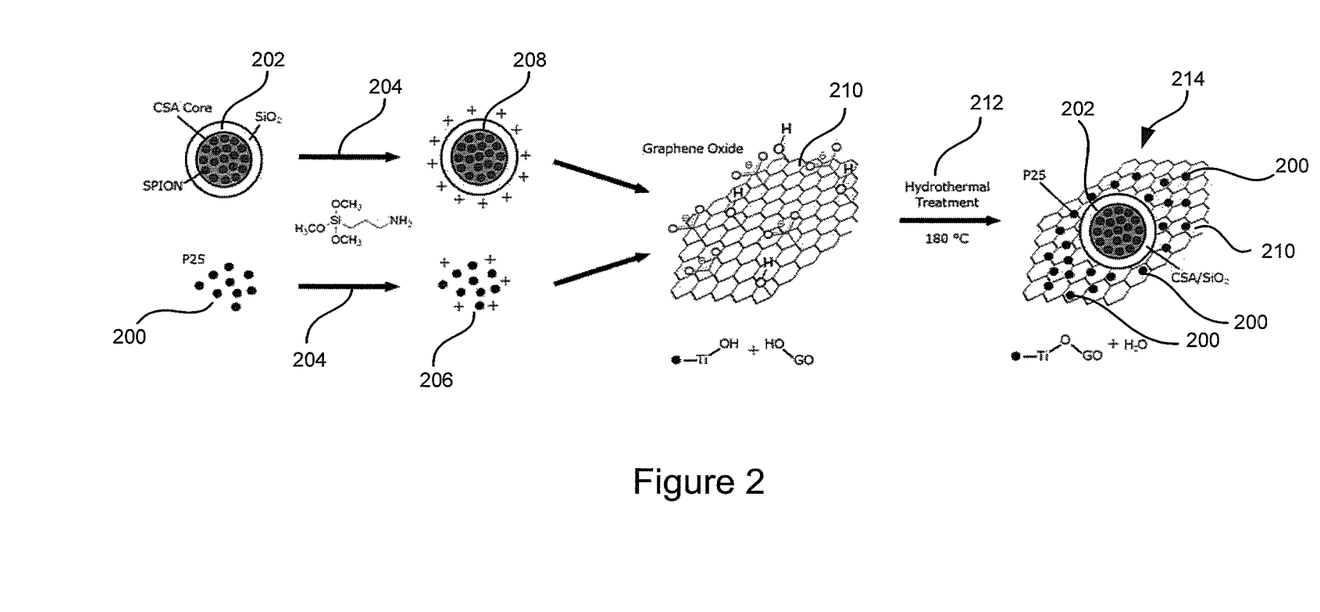
FIG. 2 is a schematic representation of one embodiment of the method of FIG. 1.

Turning to FIG. 1, a flowchart outlining a method of producing recyclable photocatalytic particulates is shown. As will be understood, the described method is modular allowing for certain processes to be performed simultaneously rather than consecutively. FIG. 2 is a schematic representation of one embodiment of the method outlined in FIG. 1 for producing a magnetically separable reduced graphene oxide supported titanium dioxide phctcatalyst.

Initially, a set of metal oxide nanoparticles are produced 100 such as, for example, a set of P25 $TiO_2$ nanoparticles 200 as shown in FIG. 2. Although different metal oxide nanoparticles such as, but not limited to, zinc oxide ($ZnO_2$), Iron Oxide ($Fe_2O_3$, $Fe_3O_4$) or any derivative of these are contemplated, in a preferred embodiment, P25 is selected as the metal oxide source since it is a well known benchmark for photocatalytic activity and also offers an advantage derived from its crystal activity phase composition. In another embodiment, the metal oxide nanoparticles may be seen as ceramic photocatalysts.

Electrically insulated, or insulative CSA, such as, but not limited to, silica-coated CSA silicon nitride-coated CSA, boron nitride-coated CSA or magnetic particles, are also produced 102. These are schematically shown in FIG. 2 as CSA 202. The production of the electrically insulated CSA may be performed at any time such as before, during or after the production of the metal oxide nanoparticles. In one embodiment, the silica-coated CSA preferably retain a superparamagnetic property while providing a high magnetic force per particle. This provides two advantages: 1) in the absence of an external magnetic field, the magnetic particles exhibit no magnetic behaviour, thereby reducing or preventing aggregation of the photocatalyctic particulate(s); and 2) after a magnetic field is applied to the particles, they separate quickly due to the large magnetic force imparted by the CSAs. The silica shell surrounding the magnetic CSA core is related to preserving both photocatalytic efficiency of the nanoparticles and magnetic susceptibility. As shown in FIG. 2, the CSA 202 includes a core portion including a silicon dioxide coating or exterior.

The silicon dioxide insulating layer reduces or prevents contact between the magnetic core of the CSA and the $TiO_2$ nanoparticle. Contact between these two may result in electric interaction whereby electrons or holes are transferred to or from one material to the other. This electron/hole transfer may result in electron/hole recombination, reducing catalyst efficiency, or inducing chemical reaction within the magnetic core rendering it non-superparamagnetic. Contact between the $TiO_2$ nanoparticle and the magnetic core may also result in an end product with significantly reduced photocatalytic and magnetic properties. Thus, an electrically insulating spacer material (the silicon dioxide layer) is included to separate the $TiO_2$ nanoparticle from the core of the CSA.

In one specific example of electrically insulated CSA production, the synthesis of silica-coated controlled iron oxide nanoparticle aggregates may be performed as follows. Sodium citrate dihydrate (100 mmol/L), urea (105 mmol/L), polyacrylamide (7.5 g/L) and iron(III) chloride (50 mmol/L) are added to 82.5 mL de-ionized water and stirred until all reagents are completely dissolved. This solution is then transferred to a 125 mL Teflon™ lined stainless steel autoclave and hydrothermally treated at 200° C. for 12 h. The product, a black aqueous suspension of iron oxide, may then be washed by magnetic decantation three times with de-ionized water followed by three times with ethanol (EtOH) and dried before coating with silica. The magnetic cores are then coated with a silicon dioxide shell via a Stöber sol-gel reaction by adding magnetic cores to a solution of EtOH, deionized water (12 mol/L) and ammonium hydroxide (0.15 mol/L) at a concentration of 1.5 mg/mL such that the final volume is about 180 mL. This solution may then be probe sonicated at 40 W for 10 min to ensure good dispersion of particles. 1 mol/L tetraethylorthosilicate (TEOS) solution in EtOH may then be added over 1 h under mechanical stirring so that the final concentration of TEOS in the reaction vessel is about 50 mmol/L.

The solution is then allowed to mix overnight (such as for about 18 hours) before being washed three times with EtOH by magnetic decantation, and finally dried under flowing nitrogen. As will be understood, there are other methods of producing electrically insulated CSAs.

Both the $TiO_2$ nanoparticles and the CSA are then amine functionalized 104 in order to produce positive surface charges on the nanoparticles and the CSA. This is schematically referenced with in FIG. 2. To enable association of the $TiO_2$ nanoparticles and silica-coated CSAs with the graphene oxide sheet (as described below), the surfaces of the CSAs and the $TiO_2$ nanoparticles may be functionalized with amine groups to affix a positive charge on their surface. In one embodiment, this may be accomplished via a simple condensation of the silane group of 3-aminopropyltrimethoxysilane (APTMS) with a surface hydroxyl group of silica or titanium dioxide. As a result of the reaction, $TiO_2$ nanoparticles and CSA with positive charge are produced (206 and 208, respectively in FIG. 2).

One example of amine-functionalization of $SiO_2$/CSAs and $TiO_2$ nanoparticles is now described with respect to a previously performed experiment. Amine functionalization was performed on P25 and $SiO_2$/CSAs separately using a simple APTMS silane coupling reaction. Particles were dispersed in EtOH at a concentration of 2 mg/mL and probe sonicated at 40 W for 10 min to ensure good dispersion. APTMS was then added so that its concentration in solution was 1% v/v. This solution was then stirred mechanically at 80° C. under reflux for 4 h. After the reaction, the particle solution was washed three times with EtOH through either magnetic decantation (for magnetic particles or CSAs) or centrifugation at 4000 rpm (for $TiO_2$ particles).

The positively charged $TiO_2$ nanoparticles and CSA are then combined 106 with a sheet of graphene oxide, preferably in solution. In other words, after both the $TiO_2$ and $SiO_2$/CSA particles are amine functionalized, they are mixed with graphene oxide in solution at varying ratios. The positively charged amine functionalized surfaces of the $TiO_2$ and the CSAs allows electrostatic interaction of the particles with the negatively charged surface of the graphene oxide sheet. A schematic example of a sheet of graphene oxide 210 is shown in FIG. 2.

In one embodiment, the amine functionalization, or modular synthesis of photocatalyctic particulate(s) by addition of amine functionalized $TiO_2$ and $SiO_2$/CSA particles to graphene oxide, may be performed as follows.

Graphene oxide suspension (prepared by sonication of graphene oxide flakes at 60 W for 2 h in EtOH), P25 suspension, and $SiO_2$/CSA suspension are added to EtOH to achieve desired concentrations and a final volume of 100 mL. Various amounts of P25 and silica CSAs were combined in this synthesis step as indicated in the following table.

TABLE 1

Synthesis conditions for tuning experiment photocatalyctic particulate variations

| Particle Weight Ratio ($TiO_2$:$SiO_2$/CSAs) | Mass of $TiO_2$ | Mass of $SiO_2$/CSAs | Mass of graphene oxide | Graphene Oxide (GO) Wgt Ratio (GO:$TiO_2$) |
|---|---|---|---|---|
| 1:1 | 18.75 mg | 18.75 mg | 1.5 mg | 1:12.5 |
| 1:4 | 18.75 mg | 75 mg | 1.5 mg | 1:12.5 |
| 1:8 | 18.75 mg | 150 mg | 1.5 mg | 1:12.5 |
| 4:1 | 75 mg | 18.75 mg | 1.5 mg | 1:50 |
| 4:4 | 75 mg | 75 mg | 1.5 mg | 1:50 |
| 4:8 | 75 mg | 150 mg | 1.5 mg | 1:50 |
| 8:1 | 150 mg | 18.75 mg | 1.5 mg | 1:100 |
| 8:4 | 150 mg | 75 mg | 1.5 mg | 1:100 |
| 8:8 | 150 mg | 150 mg | 1.5 mg | 1:100 |

After probe sonicating the synthesis suspension at 40 W for 10 min and mechanical mixing for 30 minutes, the solution was magnetically washed three times with de-ionized water, and the solvent replaced by 10 mL EtOH and 5 mL de-ionized water on the final wash. This solution was transferred to a 23 mL PTFE-lined stainless steel reaction vessel and placed in an oven to heat to 180° C. over 1.5 h. The temperature was maintained at 180° C. for 13 h before the final product was recovered and magnetically washed with EtOH three times before drying under flowing $N_2$.

Figure 7:
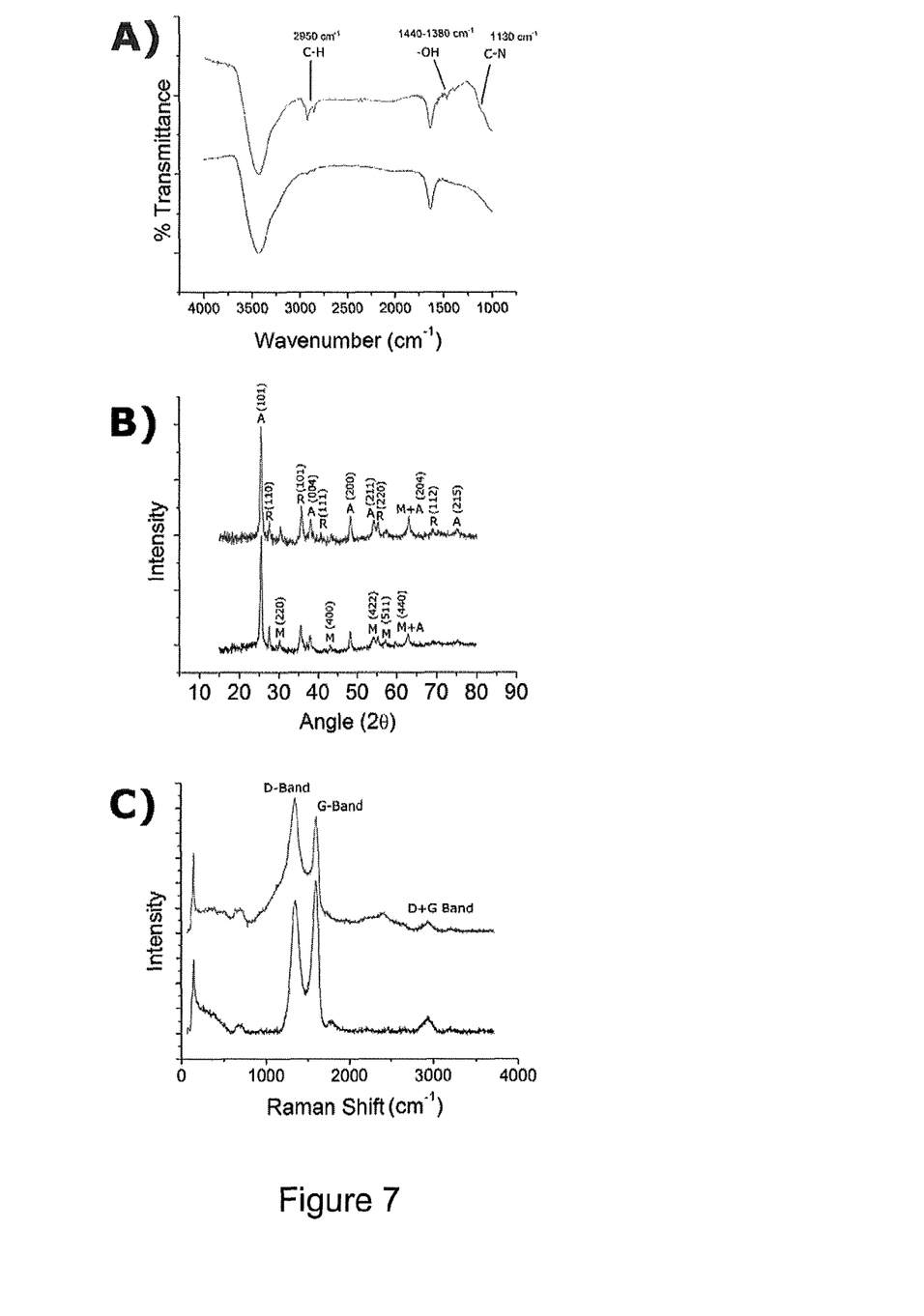
FIG. 7 is a set of graphs illustrating surface properties of photocatalyctic particulate samples.

Transmission electron microscope (TEM) samples were prepared by placing 5 μL of select photocatalyst suspensions on a 400 mesh Formvar™ coated copper grid and letting the sample dry overnight. The photocatalyctic particulate samples were then imaged using a transmission electron microscope The photocatalyst and its components were also characterized using Fourier transform infrared spectroscopy (FTIR) to determine amine functionalization of the particles prior to mixing, x-ray diffraction (XRD) to determine crystallinity of the $TiO_2$ particles before and after hydrothermal treatment, and raman spectroscopy to confirm the reduction of graphene oxide due to the hydrothermal treatment. The results of each of these characterizations can be seen in FIG. 7. XRD data was obtained using a diffractometer with a CuKα radiation source (λ, =1.5405 Å) and a Vantec-1 detector. Input voltage and current for XRD measurement were set at 32 kV and 30 mA respectively. Raman spectroscopy was performed using a microscope—spectrometer and data acquisition was done using a wavelength of 532 nm and a power of 0.2 mW. FTIR spectroscopy was done using a Fourier Transform Infrared Spectrometer.

After it is mixed, the combination is washed to remove weakly-bound particulates, then placed in a hydrothermal vessel. The combination is then placed through a hydrothermal treatment 108 (schematically shown as 212 in FIG. 2) to produce the recyclable photocatalytic particulates, or more specifically, a magnetically separable reduced graphene oxide supported titanium dioxide photcatalyst 214. As can be seen in FIG. 2, the photocatalyst 212 includes the sheet of graphene oxide 210 having multiple $TiO_2$ nanoparticles 200 and at least one CSA 202.

The hydrothermal treatment serves two purposes, the first of which is to link the $TiO_2$ and $SiO_2$/CSAs to the graphene oxide surface through a condensation reaction. The second function of the hydrothermal treatment is to convert the graphene oxide support to reduced graphene oxide. This improves the electronic properties of the photocatalytic particulates by delocalizing electron density across the support. The final photocatalytic particulates includes $TiO_2$ particles and insulated magnetic particles randomly distributed across and covalently bonded to the reduced graphene oxide surface.

Figure 3:
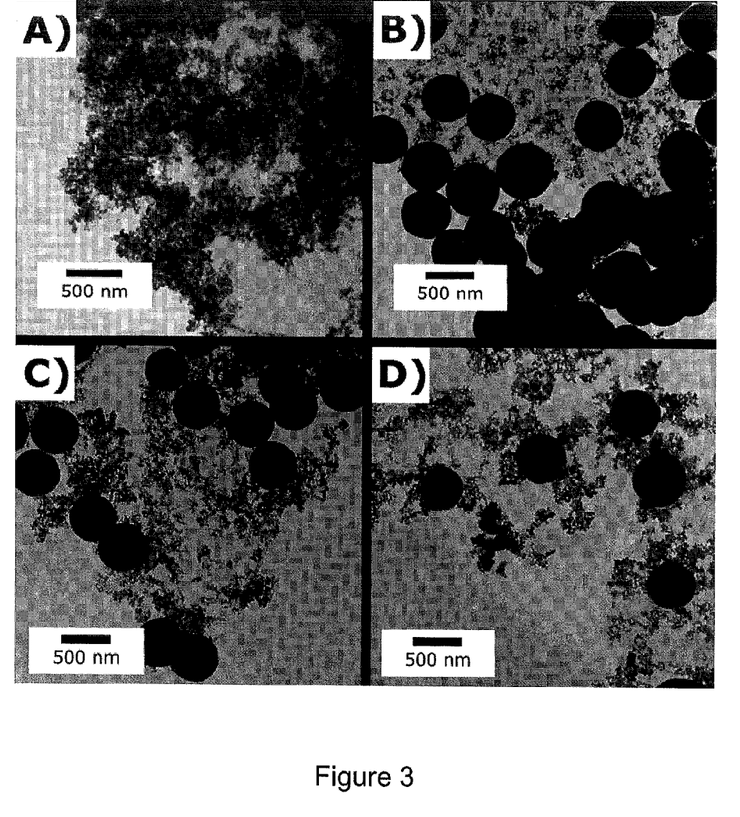
FIGS. 3A to 3D are images of different photocatalyctic particulate formulations.

Turning to FIGS. 3A to 3D, images of several embodiments of a magnetically separable reduced graphene oxide supported titanium dioxide photcatalyst are shown. FIG. 3A shows a graphene oxide sheet loaded with P25 particles (1:100 graphene oxide:$TiO_2$), FIG. 3B shows a graphene oxide sheet loaded with P25 particles and silica/CSAs (1:4 P25:CSA, 1:25 graphene oxide:$TiO_2$), FIG. 3C shows a graphene oxide sheet loaded with P25 particles and silica/CSAs (1:1 P25:CSA, 1:25 graphene oxide:$TiO_2$) and FIG. 3D shows a graphene oxide sheet loaded with P25 particles and silica/CSAs (1:1 P25:CSA, 1:12.5 graphene oxide:$TiO_2$).

Testing of the magnetically separable reduced graphene oxide supported titanium dioxide photocatalyst was performed to assess the photocatalytic and magnetic properties of the photocatalytic particulates for varying degrees of surface coverage by $TiO_2$ particles and $SiO_2$/CSA particles.

Figure 4:
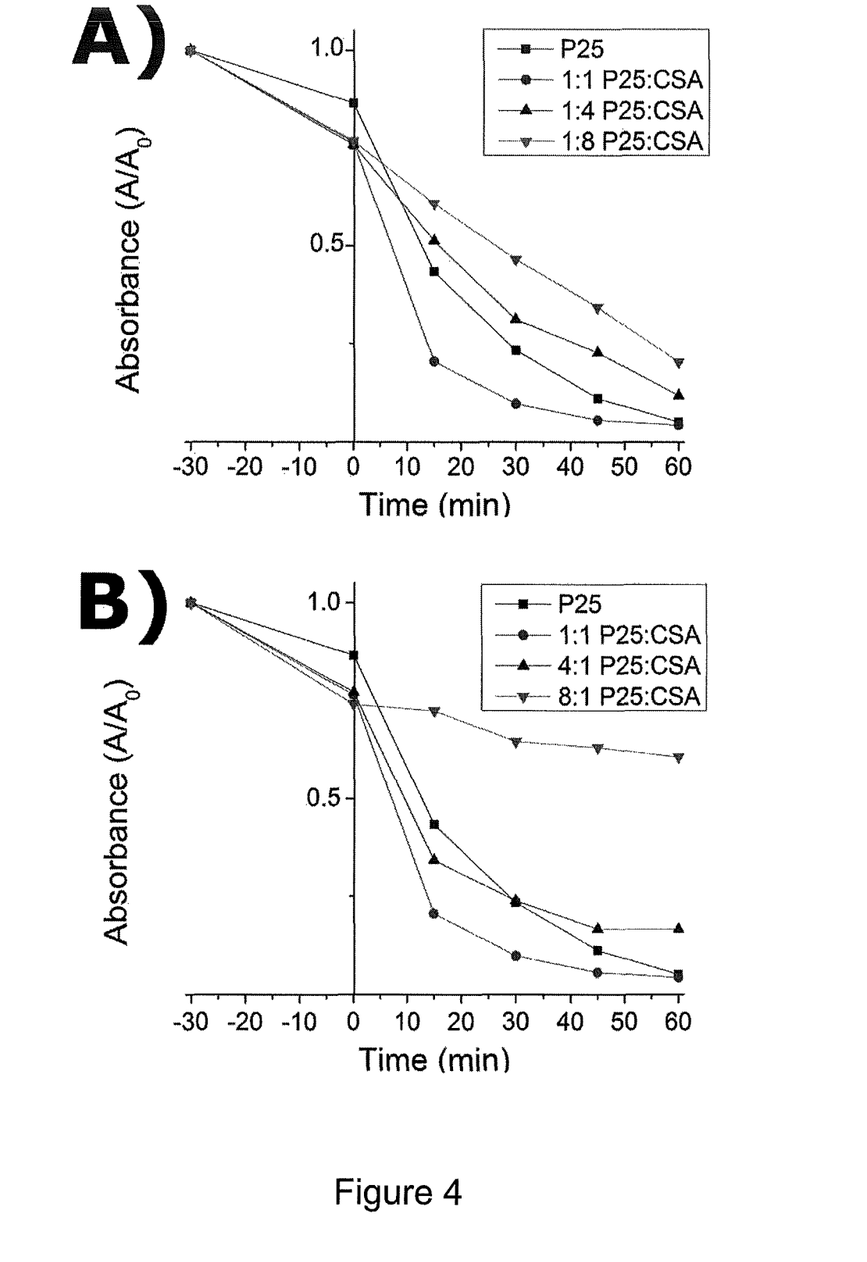
FIGS. 4A and 4B are graphs reflecting photocatalytic degradation of Methylene Blue using different photocatalyctic particulate formulations.
Figure 5:
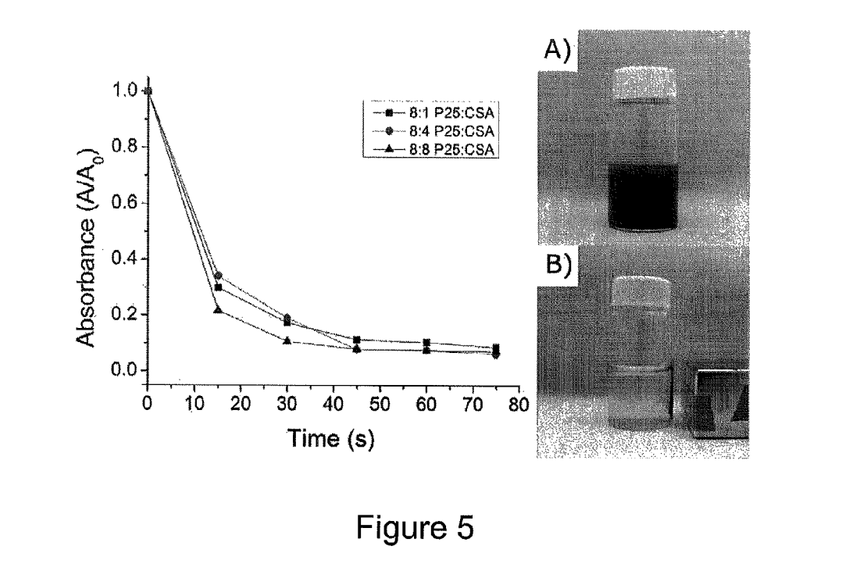
FIG. 5 is a graph and images reflecting magnetic separation efficiency of various photocatalyctic particulate formulations

It was found that increasing surface coverage of $SiO_2$/CSA magnetic particles while maintaining a constant $TiO_2$ particle coverage resulted in a reduction of photocatalytic effect (FIG. 4A). Additionally, it was found that decreasing $TiO_2$ surface coverage of the photocatalyst resulted in increased photocatalytic effect (FIG. 4B). At a contaminant concentration of 5 mg/L and a photocatalyst concentration of 0.1 mg/mL, the model contaminant could be degraded over the course of 60 minutes and the best formulation tested had a photocatalytic degradation rate exceeding that of P25, a commercial photocatalyst, by a factor of 1.2. The reason for these trends is improved dispersion of $TiO_2$ particles allowing improved or optimal contaminant mixing with $TiO_2$ and improved light harvesting by the photocatalyst. Additionally, improved $TiO_2$ dispersion allows electrical contact between $TiO_2$ and reduced graphene oxide which is known to improve photocatalysis and opens reduced graphene oxide surface sites for preferential adsorption of aromatic and polyaromatic hydrocarbons. By varying the magnetic particle loading while maintaining a high surface coverage of $TiO_2$ particles the effect of magnetic particle distribution on separation efficiency was investigated. It was found that as long as a few magnetic particles are present on each photocatalytic flake, the separation time of the photocatalytic particulate is short and recovery is good (FIG. 5).

Figure 6:
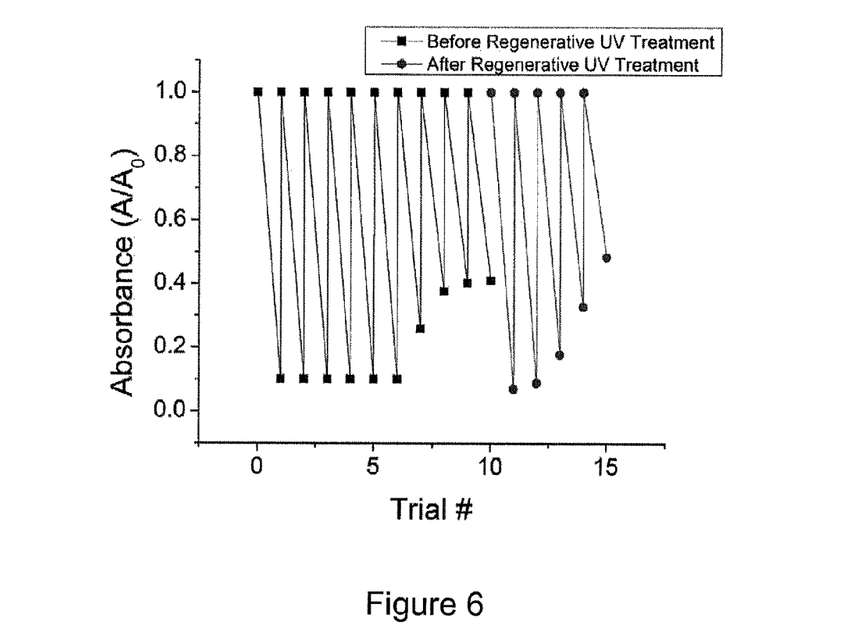
FIG. 6 is a graph reflecting recyclability of photocatalyctic particulate in consecutive degradation studies.

The efficiency of magnetic separation was proven by applying the photocatalytic particulate in a series of photocatalytic degradation studies whereby the contaminant solution is replaced every half hour and the same photocatalytic particulate sample is used to degrade the new contaminants. It was found that in a 3 mg/L contaminant solution, the photocatalytic particulate was effective for approximately five trials with no decrease in photocatalytic activity (FIG. 6). After five trials, the efficacy of the catalyst was diminished due to occlusion of catalyst surface sites by unreacted contaminant or degradation by-products. The original efficacy of the catalyst could be restored by subjecting the used photocatalytic particulate to UV treatment in water for an extended period of time (FIG. 6). This suggest that the disclosure may be indefinitely recyclable with proper treatment protocols. Overall, the disclosure details a robust photocatalytic particulate that is easily applicable to contaminated water and easily recovered and reused. The disclosure also details a modular synthesis process for the described photocatalyst that allows easy adjustment of the surface coverage by magnetic and catalytic components and should allow easy scalability for production processes.

Various other experiments were performed to determine and/or prove various characteristics of the recyclable photocatalytic particulates such as its use in water treatment and the recyclability of the particulates.

With respect to its use in water treatment, a test was performed to review the photocatalytic degradation of methylene blue using various photocatalytic particulate formulations. This is described below.

Methylene Blue (>96%) was purchased from Sigma™ and deionized water was used in each trial. Each trial contained 40 mL of reaction slurry (5 mg/L methylene blue, 0.1 mg/mL catalyst). The solution was mixed, and then placed under a UV light source with maximum output at a wavelength of 254 nm and an intensity of 0.8 W/cm2. Absorbance of the solution was taken by withdrawing 1 mL aliquots at predetermined time intervals, centrifuging them at 15,000 rpm for 10 min to ensure the absence of photocatalytic particulate(s), and analysing them using a spectrophotometer. Spectrometric measurements were taken at 668 nm as this was found to be the peak absorption wavelength of methylene blue.

Each catalyst formulation produced as shown in Table 1 was subjected to this test and the resulting degradation curves were plotted to determine a relationship between photocatalytic particulate coverage by a certain species of particle and photocatalytic efficacy. Select results demonstrating the observed trends are presented in FIG. 5.

In one experiment to show recyclability of the photocatalytic particulates, magnetic separation efficiency using various photocatalytic particulate formulations was performed.

Measurement of separation times was performed using 1 mg/mL suspensions of photocatalytic particulate in 20 mL glass vials. Vials were placed in a magnet and 1 mL aliquots of the supernatant were drawn every 15 s. After the total 75 s separation time, the aliquots were shaken to ensure good particle dispersion and analyzed by a UV/Vis spectrophotometer at 700 nm. The absorbance of the suspension at different time points corresponds to the concentration of photocatalytic particulate present at that time.

Each catalyst formulation produced as described in Table 1 was subjected to this test and the resulting separation curves were plotted to determine a relationship between photocatalytic particulate coverage by a certain species of particles and magnetic separation efficiency. Select results demonstrating the separation of particles with high $TiO_2$ loading and varying magnetic particle loadings are presented in FIG. 6.

Another experiment to determine recyclability of the photocatalytic particles was done using recovery and re-use of photocatalytic particulate in photocatalytic degradation trials A reaction slurry was made up using 3 mg/L methylene blue and 0.1 mg/mL catalyst particles. The solution was exposed to UV light, and spectrometric readings were taken as after each 30 minute period. At these points, the photocatalyst was magnetically separated from solution and the supernatant was replaced with fresh 3 mg/L Met-B solution and stirred to re-suspend settled particles. After 10 consecutive catalysis trials, the recovered photocatalytic particulate was suspended in de-ionized water and exposed to a 100 W UV-A light source overnight (16 h exposure). After overnight exposure, the water was replaced with 3 mg/L methylene blue solution as described above and catalysis trials resumed. The photocatalytic particulate was capable of being recovered and used to degrade multiple model contaminant samples and the results of this study can be seen in FIG. 7.

One or more currently preferred embodiments have been described by way of example. It will be apparent to persons skilled in the art that a number of variations and modifications can be made without departing from the scope of the disclosure as defined in the claims.

What is claimed is:

1. A method of producing a recyclable photocatalytic particulate comprising:
    producing electrically insulated magnetic particles;
    retrieving ceramic photocatalysts;
    amine functionalizing ceramic photocatalysts and electrically insulated magnetic particles; and
    combining the amine functionalized ceramic photocatalysts and amine functionalized electrically insulated magnetic particles with a graphene oxide sheet.

2. The method of claim 1 further comprising hydrothermal treating the combination of the graphene oxide sheet and amine functioned ceramic photocatalysts and amine functionalized electrically insulated magnetic particles to form covalent bonds between the graphene oxide sheet and the amine functioned ceramic photocatalysts and the graphene oxide sheet and the amine functionalized electrically insulated magnetic particles.

3. The method of claim 1 wherein retrieving ceramic photocatalysts comprises retrieving metal oxide nanoparticles.

4. The method of claim 3 wherein retrieving metal oxide nanoparticles comprises retrieving titanium dioxide nanoparticles.

5. The method of claim 1 wherein producing electrically insulated magnetic particles comprises producing silica-coated controlled aggregates (CSAs).

6. The method of claim 1 wherein the amine functionalizing comprises using aminopropyltrimethoxysilane (APTMS) to amine functionalize.

7. A recyclable photocatalytic particulate comprising:
at least one ceramic photocatalyst;
electrically insulated magnetic particles; and
a sheet of graphene oxide;
wherein the at least one ceramic photocatalyst and the electrically insulated magnetic particles are amine functionalized before being combined with the sheet of graphene oxide; and
wherein the at least one ceramic photocatalyst and the electrically insulated magnetic particles are produced independent of each other.

8. The recyclable photocatalytic particulate of claim 7 wherein the particulate is hydrothermally treated after the photocatalyst and the magnetic particles are combined with the sheet of graphene oxide.

9. The recyclable photocatalytic particulate of claim 7 wherein the at least one ceramic photocatalyst is at least one metal oxide nanoparticle.

10. The recyclable photocatalytic particulate of claim 9 wherein the at least one metal oxide nanoparticle is at least one titanium dioxide nanoparticle.

11. The recyclable photocatalytic particulate of claim 7 wherein the electrically insulated magnetic particles are silica-coated controlled SPION aggregates (CSAs).

12. The recyclable photocatalytic particulate of claim 7 wherein the amine functionalization is performed with aminopropyltrimethoxysilane (APTMS).

13. The recyclable photocatalytic particulate of claim 9 wherein the at least one metal oxide nanoparticle is zinc oxide, iron oxide, any derivative of zinc oxide, or any derivative of iron oxide.

14. The recyclable photocatalytic particulate of claim 7 wherein the electrically insulated magnetic particles are silicon nitride-coated controlled aggregates (CSAs) or boron nitride-coated CSAs.

* * * * *